United States Patent
Banipal et al.

(10) Patent No.: US 11,809,481 B2
(45) Date of Patent: Nov. 7, 2023

(54) CONTENT GENERATION BASED ON MULTI-SOURCE CONTENT ANALYSIS

(71) Applicant: INTERNATIONAL BUSINESS MACHINES CORPORATION, Armonk, NY (US)

(72) Inventors: Indervir Singh Banipal, Austin, TX (US); Shikhar Kwatra, San Jose, CA (US); Zia K Mohammad, Austin, TX (US); Nadiya Kochura, Bolton, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/248,995

(22) Filed: Feb. 17, 2021

(65) Prior Publication Data

US 2022/0261432 A1   Aug. 18, 2022

(51) Int. Cl.
*G06F 40/279* (2020.01)
*G06F 16/438* (2019.01)
(Continued)

(52) U.S. Cl.
CPC ........ *G06F 16/4387* (2019.01); *G06F 16/435* (2019.01); *G06F 16/483* (2019.01);
(Continued)

(58) Field of Classification Search
CPC .. G06F 16/4387; G06F 16/435; G06F 16/483; G06F 40/279; G06F 40/40;
(Continued)

(56) References Cited

U.S. PATENT DOCUMENTS 6,460,036 B1   10/2002  Herz
7,925,708 B2    4/2011  Davis
(Continued)

OTHER PUBLICATIONS

Businesswire, "U.S. Newspaper Market Size, Share & Trends Analysis (2018-2025) by Revenue Generation—ResearchAndMarkets.com", https://www.businesswire.com/news/home/20181031005333/en/U.S.-N . . . , Oct. 31, 2018, pp. 1-2.
(Continued)

*Primary Examiner* — Sanchita Roy
(74) *Attorney, Agent, or Firm* — Tihon Poltavets (57) ABSTRACT

A method for chronologically aggregating media content for a specific topic from media content providers includes receiving multi-type media content relating to the specific topic, where the multi-type media content includes at least a first type of media content and a second type of media content. Identifying a first statement in a first portion of the first type of media content that responds to a second statement in a second portion of the second type of media content. Determining a chronological sequence for the first portion of the first type of media content and the second portion of the second type of media content, where the first portion of the first type of media content occurs after the second portion of the first type of media content. Generating a final media content presentation file for the determined chronological sequence.

15 Claims, 7 Drawing Sheets

(51) Int. Cl.
　　　*G06F 16/435*　　(2019.01)
　　　*G06F 40/40*　　(2020.01)
　　　*G06F 16/487*　　(2019.01)
　　　*G06F 16/483*　　(2019.01)
(52) U.S. Cl.
　　　CPC .......... *G06F 16/487* (2019.01); *G06F 40/279* (2020.01); *G06F 40/40* (2020.01)
(58) Field of Classification Search
　　　CPC ........ G06F 40/10; G06F 40/20; G06F 16/487; G06F 40/35; G06F 40/56
　　　See application file for complete search history.

(56) References Cited

U.S. PATENT DOCUMENTS

| | | | |
|---|---|---|---|
| 7,991,770 | B2 | 8/2011 | Covell |
| 9,268,770 | B1* | 2/2016 | Kursun ................ G06F 40/30 |
| 9,361,369 | B1 | 6/2016 | Bharat |
| 2012/0124147 | A1* | 5/2012 | Hamlin ................ H04L 51/08 |
| | | | 709/206 |
| 2014/0137026 | A1* | 5/2014 | Matas ................ G06Q 50/01 |
| | | | 715/780 |
| 2015/0006510 | A1* | 1/2015 | Efrati ................ G06F 16/248 |
| | | | 707/722 |
| 2015/0127643 | A1 | 5/2015 | Cohen |
| 2015/0186532 | A1 | 7/2015 | Agarwal |
| 2016/0004667 | A1* | 1/2016 | Chakerian ............ G06F 16/285 |
| | | | 715/277 |
| 2017/0235820 | A1 | 8/2017 | Conrad |
| 2017/0293399 | A1* | 10/2017 | Ewanko ................ H04L 51/32 |
| 2018/0137400 | A1* | 5/2018 | Deselaers ............ G06N 3/0445 |
| 2019/0095063 | A1* | 3/2019 | Haapsaari ........... G06F 3/04883 |
| 2020/0186645 | A1* | 6/2020 | Gorny ............... H04M 3/42365 |
| 2021/0118033 | A1* | 4/2021 | Coker ................ G06Q 20/401 |

OTHER PUBLICATIONS

Fiormarkets, "Global Big Data and Data Engineering Services Market is Engineering Services Market is Expected to Reach USD 123.89 Billion by2025: Fior Markets", https://www.globenewswire.com/news-release/2020/02/03/1978691/0/en . . . , printed Dec. 23, 2020, pp. 1-6.

He et al., "Discovering Canonical Correlations between Topical and Topological Information in Document Networks", CIKM'15, Oct. 19-23, 2015, pp. 1-10.

Mell et al., "The NIST Definition of Cloud Computing", National Institute of Standards and Technology, Special Publication 800-145, Sep. 2011, pp. 1-7.

Prnewswire, "Television Broadcasting Services market to be Worth US$755.5 Bn by 2026: Transparency Market Research", https://www.prnewswire.com/news-releases/television-broadcasting-serv . . . , May 30, 2018, pp. 1-7.

* cited by examiner

CONTENT GENERATION BASED ON MULTI-SOURCE CONTENT ANALYSIS

BACKGROUND

This disclosure relates generally to content generation, and in particular to generating content based on an analysis and chronological sequencing of multi-source content. Presently, media content is provided through various sources, where a correlation often exists between multi-types of media content for a specific topic. However, the correlation between the multi-types of media content for the specific topic are often not captured at a similar time or location. Therefore, a user viewing the media content would have to perform a search across the various sources to identify the correlation for the specific topic that might not be apparent and view the multi-types of media content for the specific topic at the various sources.

SUMMARY

Embodiments in accordance with the present invention disclose a method, computer program product and computer system for chronologically aggregating media content for a specific topic from media content providers, the method, computer program product and computer system can receive multi-type media content relating to a specific topic, wherein the multi-type media content includes at least a first type of media content and a second type of media content. The method, computer program product and computer system can identify a first statement in a first portion of the first type of media content that responds to a second statement in a second portion of the second type of media content. The method, computer program product and computer system can determine a chronological sequence for the first portion of the first type of media content and the second portion of the second type of media content, wherein the first portion of the first type of media content occurs after the second portion of the first type of media content. The method, computer program product and computer system can generate a final media content presentation file for the determined chronological sequence that includes at least the first portion of the first type of media content and the second portion of the second type of media content.

DETAILED DESCRIPTION

Embodiments of the present invention utilize context analysis via long short-term memory (LSTM) module working in conjunction with natural language processing (NLP) operating on multiple types of media content (e.g., video, audio) to identify statement and responses in the multiple types of media content. The statements and responses can include questions, answers, opinions, comments, and arguments relating to a specific topic, where each portion of the multiple types of media content is isolated and segmented. Portions of the multiple types of media content are arranged and sequenced to generate a final media content presentation file to highlight the identified statement and responses in the multiple types of media content.

Figure 1:
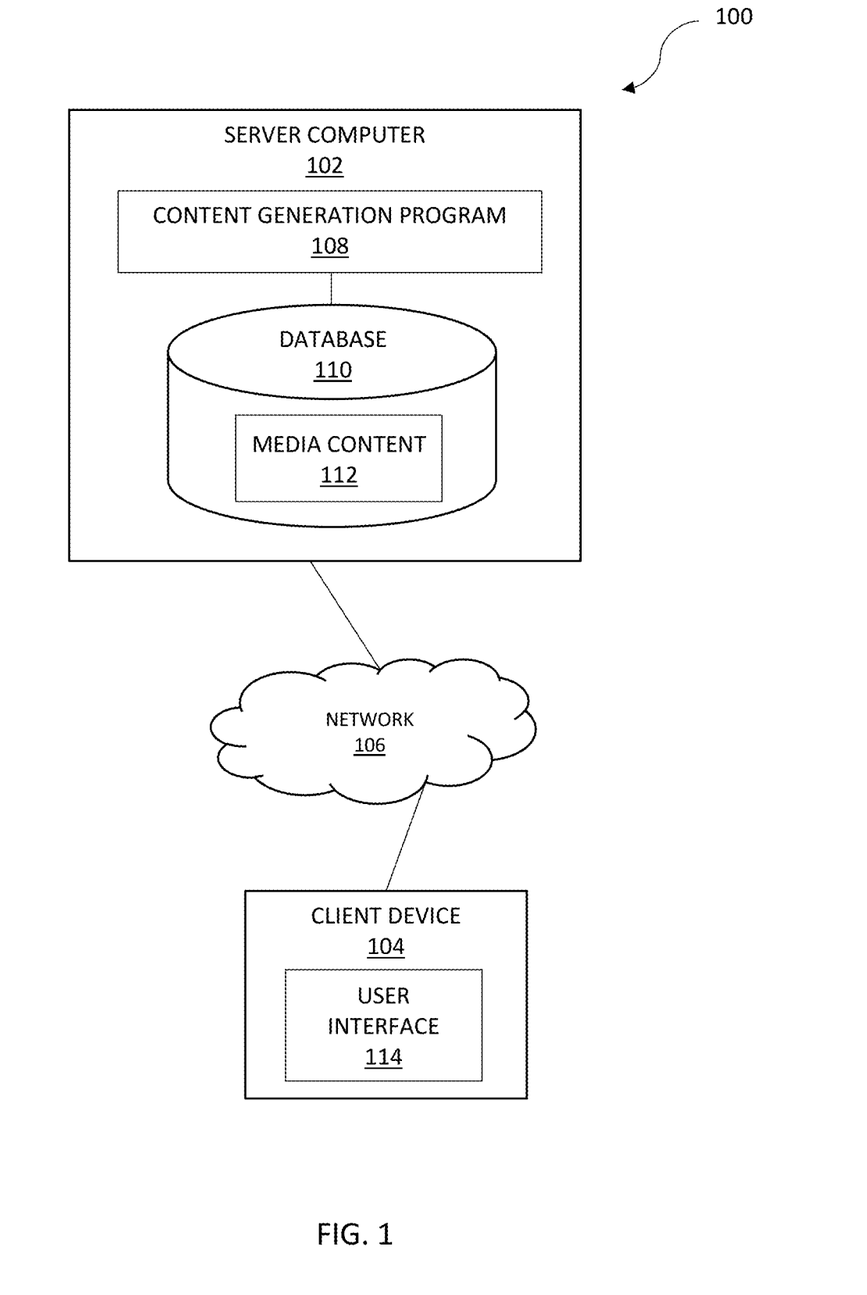
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment includes server computer 102 and client device 104, interconnected over network 106. Server computer 102 can be a standalone computing device, a management server, a web server, a mobile computing device, or any other electronic device or computing system capable of receiving, sending, and processing data. In other embodiments, server computer 102 can represent a server computing system utilizing multiple computers as a server system, such as in a cloud computing environment. In another embodiment, server computer 102 can be a laptop computer, a tablet computer, a netbook computer, a personal computer (PC), a desktop computer, a personal digital assistant (PDA), a smart phone, or any programmable electronic device capable of communicating with client device 104 and other computing devices (not shown) within the distributed data processing environment via network 106. In another embodiment, server computer 102 represents a computing system utilizing clustered computers and components (e.g., database server computers, application server computers, etc.) that act as a single pool of seamless resources when accessed within the distributed data processing environment. Server computer 102 includes content generation program 108, database 110, and media content 112. Server computer 102 may include internal and external hardware components, as depicted and described in further detail with respect to FIG. 5.

Client device 104 can be a laptop computer, a tablet computer, a smart phone, smart watch, a smart speaker, or any programmable electronic device capable of communicating with various components and devices within the distributed data processing environment, via network 106. Client device 104 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 104 represents one or more programmable electronic devices or combination of programmable electronic devices capable of executing machine readable program instructions and communicating with other computing devices (not shown) within the distributed data processing environment via a network, such as network 106. In one embodiment, client device 104 represents one or more devices associated with a user. Client device 104 includes an instance of user interface 114 for interacting with content generation program 108 on server computer 102.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks capable of receiving and transmitting data, voice, and/or video signals, including multimedia signals that include voice, data, and video information. In general, network 106 can be any combination of connections and protocols that will support communications between server computer 102 and client device 104, and other computing devices (not shown) within the distributed data processing environment.

Content generation program 108 provides a final media content presentation file based on an analysis of multi-type media content from multi-source media content providers. Content generation program 108 can receive media content relating to various topics from multi-source media content providers (e.g., media content 112 on database 110) and identify a portion of the media content from the multi-source media content providers relating to a specific topic. The portion of the media content from the multi-source media content providers relating to the specific topic include multiple types of media content (i.e., multi-type media content). Content generation program 108 can identify each type of the multi-type media content and identify statements and responses in the multi-type media content relating to the specific topic. Content generation program 108 can analysis the multi-type media content for the specific topic and determine a sequence for the identified types and identified statements and responses in the multi-type media content relating to the specific topic. Content generation program 108 can generate a final media content presentation file for the determined sequence and display the final media content presentation file in user interface 114 on client device 104.

Database 110 is a repository that stores media content 112 relating to various topics from multi-source media content providers. In the depicted embodiment, database 110 resides on server computer 102. In another embodiment, database 110 may reside on client device 104 or elsewhere within the distributed data processing environment provided content generation program 108 has access to database 110. A database is an organized collection of data. Database 110 can be implemented with any type of storage device capable of storing data and configuration files that can be accessed and utilized by content generation program 108, such as a database server, a hard disk drive, or a flash memory. Database 110 stores media content 112 used by content generation program 108, such as audio files, video files, image files, text files, forum posts, blog posts, social media post, and any other media content accessible by a user of client device 104.

User interface 114 enables a user to make requests of or issue commands to client device 104 and receive information and instructions in response. In one embodiment, a user of client device 104 accesses user interface 114 via voice commands in natural language. In one embodiment, user interface 114 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 114 may also be mobile application software. In an example, mobile application software, or an "app," is a computer program designed to run on smart phones, tablet computers and other mobile devices. User interface 114 enables a user of client device 104 to interact with content generation program 108 and enables content generation program 108 to display a final media content presentation file to the user of client device 104.

Figure 2:
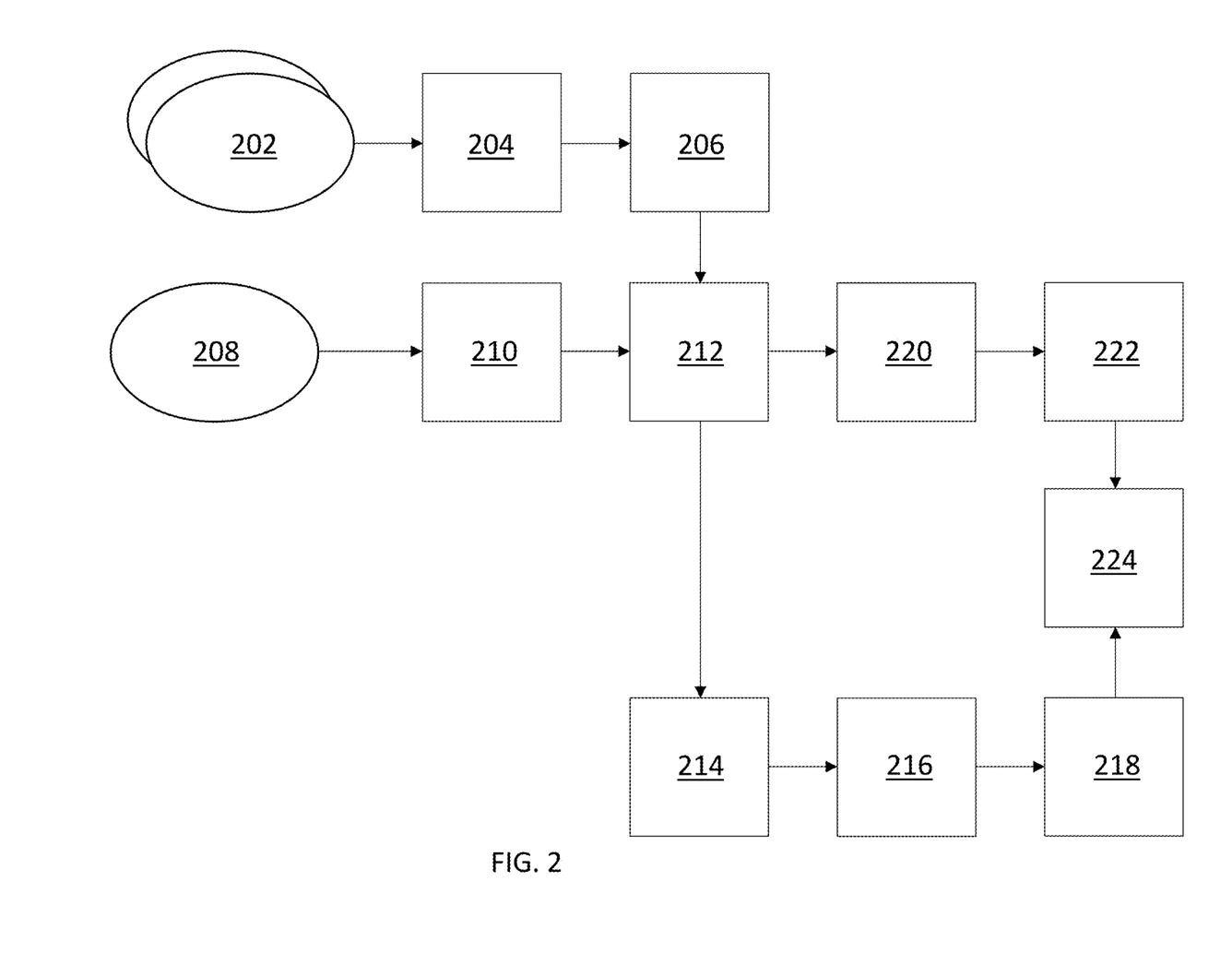
FIG. 2 represents a process flow of a content generation program, in accordance with an embodiment of the present invention.

FIG. 2 represents a process flow of a content generation program, in accordance with an embodiment of the present invention. In this embodiment, content generation program 108 receives audio and textual data 202, where content generation program 108 analyzes (204) audio and textual data 202 via Mel Frequency Cestrum Coefficient (MFCC) and Natural Language Process (NLP) global vectors for word representation tokenization. Content generation program 108 performs (206) frame wise geotagging, duration, and time sequencing for audio and textual data 202. Content generation program 108 also receives video data 208, where content generation program 108 analyzes (210) video data via long short-term memory (LSTM) utilizing a convolutional neural network (CNN) and dense captioning. Content generation program 108 generates (212) a frame wise scene graph for the analyzed audio and textual data 203 and video data 208. Content generation program 108 performs (214) a key frame extraction based on similarity, graphs (216) aggregation from the key frames, and identifies (218) queries in the key frames (e.g., yes/no questions, contextual questions, temporal questions). In parallel, content generation program 108 graphs (220) aggregation from all frames and identifies (222) queries in all the frames (e.g., yes/no questions, contextual questions, temporal questions). Subsequently, content generation program 108 performs (224) a comparison of the identifies queries in the key frames to the identified queries in all the frames.

Figure 3:
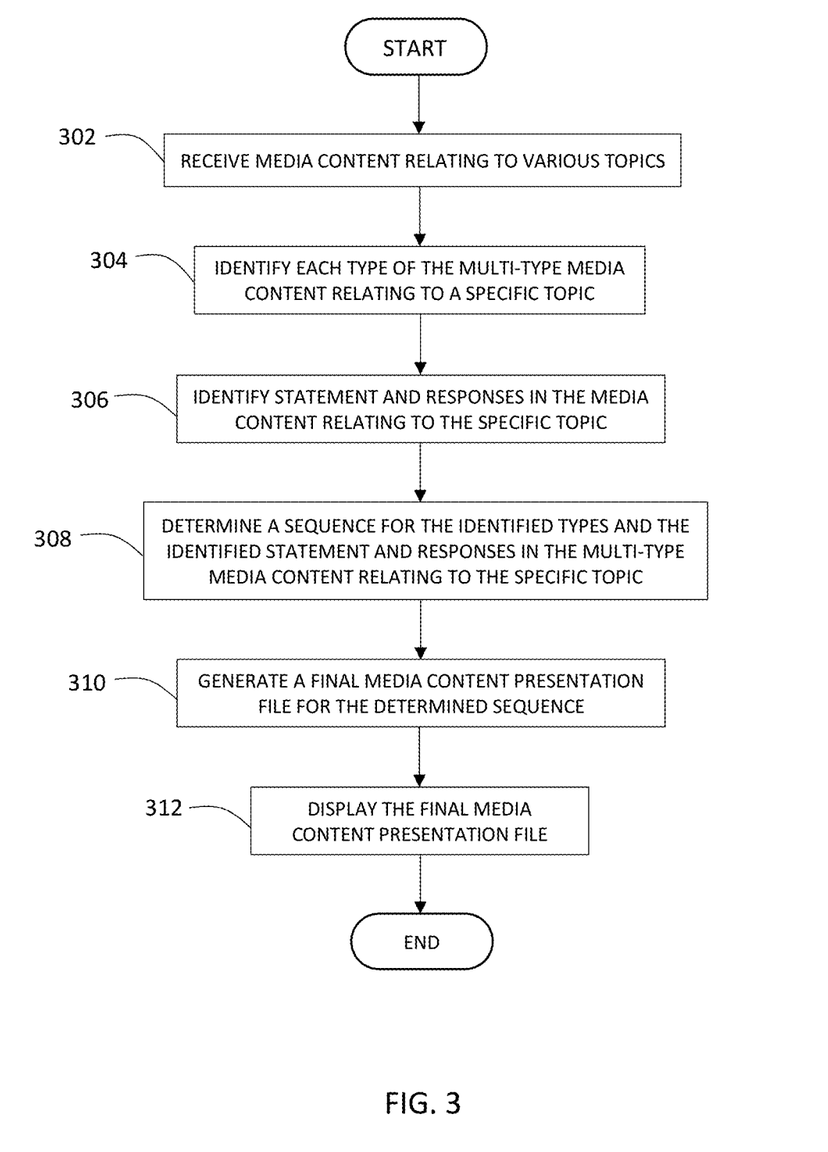
FIG. 3 is a flowchart depicting operational steps of a content generation program for generating a final media content presentation file based on multi-types of media content from multiple sources, in accordance with an embodiment of the present invention.

FIG. 3 is a flowchart depicting operational steps of a content generation program for generating a final media content presentation file based on multi-types of media content from multiple sources, in accordance with an embodiment of the present invention.

Content generation program 108 receives (302) media content relating to various topics. Content generation program 108 receives media content from multi-source media content providers for various topics, where multi-source media content providers can include news platforms, social media platforms, blogs, forums, or any other type of digital platform on which media content can be shared and/or distributed. Examples of media content include news images, news reels, news articles, social media posts, blog posts, forums posts, or any other audible, textual, and/or video based digital content. In this embodiment, content generation program 108 receives media content relating to various topics, where a user of content generation program 108 has the ability to search for a specific topic (e.g., breaking news story, product release) from the various topics. For discussion purposes, a specific topic identifies a portion of the media content that includes multiple types of media content referred to as multi-type media content, where types of media content include audio, video, and/or textual content. Content generation program 108 can include a search feature for inputting one or more words associated with the specific topic of interest to the user, where content generation program 108 identifies the multi-type media content relating to the specific topic based on the one or more words associated with the specific topic.

In one example, a news platform includes media content relating to various news events (i.e., various topics), where each news event includes multi-type media content (e.g., video file, text article, and embedded social media post). Content generation program 108 allows for a user to search the media content relating to the various news events on the news platform for a specific topic, where content generation program 108 is to generate a file media content presentation file for the multi-type media content relating to the specific topic. In another example, a webpage for a technology company includes a news section for software product release information (i.e., various topics), where each software product release includes multi-type media content (e.g., global announcement text, video file, and a product specification portable document filed (PDF)). Each software product release can include various updates and bug fixes through a lifecycle of the software product, where content generation program 108 allows for a user to identify a specific software product (i.e., specific topic) and generate a final media content presentation file for the specific software product spanning the lifecycle.

Content generation program 108 identifies (304) each type of the multi-type media content relating to a specific topic. Responsive to receiving the specific topic selection from the user, content generation program 108 identifies each type of the multi-type media content relating to the specific topic available to generate a final media content presentation file. As previously discusses, a type of the multi-type media content includes audio, video, and/or textual, where a single media content file can include one or more types of multi-type media content (e.g., video with textual subtitles). Content generation program 108 can identify each type of the multi-type media content relating to the specific topic with defined time parameters (e.g., last seven days) or with no defined time parameters. In one example, content generation program 108 previously received a specific topic from a user on a news platform, where the specific topic related to budgetary negotiations. Content generation program 108 utilizes defined time parameters to identify each type of the multi-type media content relating to budgetary negotiations within the last seven days. Utilizing the defined time parameters allows for content generation program 108 to identify types of multi-type media relating to current news surrounding budgetary negotiations. The time parameters can define one or more periods of time for identifying each type of the multi-type media content relating to the specific topic. In this example, content generation program 108 identifies a video interview regarding budgetary negotiations, an article with an image graphic detailing a proposed budget, and multiple social media posts by members of the budgetary committee as the various types of the multi-type media content for the defined time parameters.

In another example, content generation program 108 previously received a specific topic from a user on a webpage for a technology company, where the specific topic relates to a software product release. Content generation program 108 does not utilize defined time parameters to identify types of multi-types of media content relating to the software product release, since all information and software revisions of the software product release are pertinent to the user. In this example, content generation program 108 identifies a global announcement press release, a video message from the CEO regarding the global announcement with subtitle text, and a product specification PDF attachment sourced from a webpage with the global announcement press release. Content generation program 108 can utilize a defined time parameter (as previously discussed above) and/or predefined limits to ensure an excessive and/or redundant amount of multi-type media content for a specific topic is not identified for generating the final media content presentation file. The predefined limits can include file size (e.g., 256 MB), video length (e.g., x<10 min), audio length (e.g., x<90 min), an amount of text (e.g., word count), an amount of video files (e.g., 3 video files), an amount of audio files (e.g., 5 audio files), file version limits (e.g., latest version), and a publishing date.

Content generation program 108 identifies (306) statement and responses in the media content relating to the specific topic. In this embodiment, statement and responses can include questions, answers, opinions, comments, and arguments relating to the specific topic. Content generation program 108 identifies each statement and response in the multi-type media contents and subsequently, isolates and segments each portion of the multi-type media content that includes each statement and response. For audio and textual types of multi-type media content relating to the specific topic, content generation program 108 analyzes the audio and textual data via Mel Frequency Cestrum Coefficient (MFCC) and Natural Language Process (NLP) global vectors for word representation tokenization. For video types of multi-type media content relating to the specific topic, content generation program 108 analyzes the video data via long short-term memory (LSTM) utilizing a convolutional neural network (CNN) and dense captioning. Content generation program 108 can utilizes predictive confidence scores to identify correct statement and response combinations across the various types of multi-type media content, where content generation program 108 subsequently determines a sequence for each statement and response discussed in further detail with regards to (308).

In one example, where a specific topic is related to budgetary negotiations, content generation program 108 previously identified a video interview regarding budgetary negotiations, an article with an image graphic detailing a proposed budget, and multiple social media posts by members of the budgetary committee as the various types of the multi-type media content for the defined time parameters. Content generation program 108 identifies statement and responses in the various types of the multi-type media content. For a video interview regarding budgetary negotiations, content generation program 108 analyzes the video file and identifies statements and comments provided in the video interview. For an article with image graphic detailing a proposed budget, content generation program 108 analyzes the text and image and identifies statements and comments provided in the article. For the multiple social media posts by members of the budgetary committee, content generation program 108 analyzes the text and any intended recipients to identify statements and comments provided in the social media posts. It is to be noted that statements and comments can transcend a single type of media content, where a statement made by a first person on a first type of media content (e.g., video interview) is responded to by a second person on a second type of media content (e.g., social media post).

In another example, where a specific topic is related to the software product release, content generation program 108 previously identified a global announcement press release, a video message from the CEO regarding the global announcement with subtitle text, and a product specification PDF attachment sourced from a webpage with the global announcement press release as the various types of multi-type media content. Content generation program 108 identifies statement and responses in the various types of the multi-type media content. For a global announcement press release, content generation program 108 analyzes the text and identifies statements and comments provided in the press release. For a video message from the CEO regarding the global announcement with subtitle text, content generation program 108 analyzes the video and subtitle text to identify statement and comments provided with the video message. For a product specification PDF attachment sourced from the webpage with the global announcement, content generation program 108 analyzes the text of the product specification, along with any identifiable authors, to identify statement and comments provided in the PDF. As previously noted, statements and comments can transcend a single type of media content, where a statement provided in a first type of media content (e.g., product specification PDF) is referred to another statement provided in a second type of media content (e.g., global announcement press release).

Content generation program 108 determines (308) a sequence for the identified types and the identified statement and responses in the multi-type media content relating to the specific topic. In this embodiment, content generation program 108 analyzes a duration of each type of multi-type media content for the specific topic, including the identified statement and comments in the multi-type media. Content generation program 108 can ingest: X_1<Data/Time format>=Event Timing, X_2<word2Vec>=Sentence Segmentation and Tokenization (i.e., context of comments and responses during the event), X_3<NLC analysis/time>=Comment and Response Duration. These provide the features for content generation program 108 determining a chronological sequence for the identified types and the identified statement and response in the multi-type media content relating to the specific topic. The sequencing allows for content generation program 108 to chronologically assemble each portion of the multi-type media content that was isolated and segmented for each of the identified statement and response.

In one example, where the specific topic is related to budgetary negotiations, content generation program 108 previously identified statement and responses in the various types of the multi-type media content. Content generation program 108 identifies that a statement made by a first person on a first type of media content (e.g., video interview regarding budgetary negotiations) states that negotiations are deadlocked due to unresolved disagreements with a second person. Content generation program 108 identifies that a response made by the second person on a second type of media content (e.g., social media posts by a member of the budgetary committee) confirms that negotiations are indeed deadlocked die to an unresolved disagreement over issue A. Content generation program 108 determines a sequencing of the identified statement and response based on both, the identified type of multi-type media content (i.e., video interview and social media post) and the identified statement and response by the first and the second person. Content generation program 108 determines the sequence as the first person on the first type of media content as initiating with the statement and the second person on the second type of media content as responding to the initiating statement.

In another example, where the specific topic is related to the software product release, content generation program 108 previously identified statement and responses in the various types of the multi-type media content. Content generation program 108 identifies a first statement provide in a first type of media content (e.g., product specification PDF attachment from a webpage with a global announcement press release) detailing five key new features included in the software product release. Content generation program 108 identifies a second statement provided in a second type of media content (e.g., global announcement press release webpage) listing five new features in the software product release. Content generation program 108 determines a sequencing of the identified statement and response based on both, the identified type of multi-type media content (i.e., product specification PDF and press release) and the identified first and second statements. Content generation program 108 determines the sequence as the second statement introducing the list of the five new features and the first statement as detailing the five new features in the software product release.

Content generation program 108 generates (310) a final media content presentation file for the determined sequence. Content generation program 108 generates the final media content presentation by sequencing portions of each type of the multi-type media content associated with the identified statements and responses from (306). In one embodiment, content generation program 108 overlays the sequenced portions of each type of the multi-type media content over a single media content type (i.e., base media content) for the identified statements and responses. As a result, content generation program 108 utilizes the single media content as base media content to provide context for the identified statement and responses. In another embodiment, content generation program 108 sequences the portions of each type of the multi-type media content without overlaying the sequenced portions over another media content type (i.e., based media content). As a result, content generation program 108 generates a final media content presentation for only the identified statement and responses from (306).

In one example, where the specific topic is related to budgetary negotiations, content generation program 108 previously determined a sequencing of the identified statement and response based on both, the identified type of multi-type media content (i.e., video interview and social media post) and the identified statement and response by the first and the second person. Content generation program 108 determined the sequence as the first person on the first type of media content as initiating with the statement and the second person on the second type of media content as responding to the initiating statement. Content generation program 108 generates a final media content presentation file for the determined sequence, where content generation program 108 segments a portion (e.g., three-minute clip of a twenty-minute interview) of the video interview with the first person corresponding to the initiated statement and overlays the social media post for a sub-portion (e.g., final ten seconds of the three-minute clip) of the portion of the video interview. As a result, content generation program 108 generates a final media content presentation file that is a three-minute video interview clip that includes an overlaying social media post in the final ten seconds on the three-minute video. Alternatively, content generation program 108 generates a final media content presentation utilizing the twenty-minute video interview as the base media content, where in the final ten seconds of the three-minute segment in the twenty-minute video includes the overlaying social media post.

In another example, where the specific topic is related to the software product release, content generation program 108 previously determined a sequencing of the identified statement and response based on both, the identified type of multi-type media content (i.e., product specification PDF and press release) and the identified first and second statements. Content generation program 108 determines the sequence as the second statement introducing the list of the five new features and the first statement as detailing the five new features in the software product release. Content generation program 108 generates a final media content presentation file for the determined sequence, where content generation program 108 segments a first portion of the product specification PDF detailing the five new features in the software product release and segments a second portion of the global announcement press release on the webpage. In this example, content generation program 108 utilizes the video message from the CEO regarding the global announcement as a base media content on which content generation program 108 overlays the first portion of the product specification PDF (i.e., first media content) and the second portion of the global announcement press release on the webpage (i.e., second media content). Content generation program 108 generates a final media content presentation file, where the video message from the CEO regarding the global announcement includes the first portion and the second portion as overlays at a point in the video message when the five features in the software product release are mentioned.

Content generation program 108 displays (312) the final media content presentation file. Content generation program 108 displays the final media content presentation file on a client device associated with the user who previously selected the specific topic in (302). In one example as discussed above, content generation program 108 displays a three-minute video interview clip that includes an overlaying social media post in the final ten seconds on the three-minute video. In another example as discussed above, content generation program 108 displays the twenty-minute video interview as the base media content, where in the final ten seconds of the three-minute segment in the twenty-minute video includes the overlaying social media post. In yet another example as discussed above, content generation program 108 displays a video message from the global announcement that includes the first portion and the second portion as overlays at a point in the video message when the five features in the software product release are mentioned. Content generation program 108 can also query the user for feedback upon displaying the final media content presentation file, where the user has the ability to adjust one or more of a time parameter and a predefined limits that can include file size (e.g., 256 MB), video length (e.g., x<10 min), audio length (e.g., x<90 min), an amount of video files (e.g., 3 video files), an amount of text (e.g., word count), an amount of audio files (e.g., 5 audio files), file version limits (e.g., latest version), and a publishing date.

Figure 4:
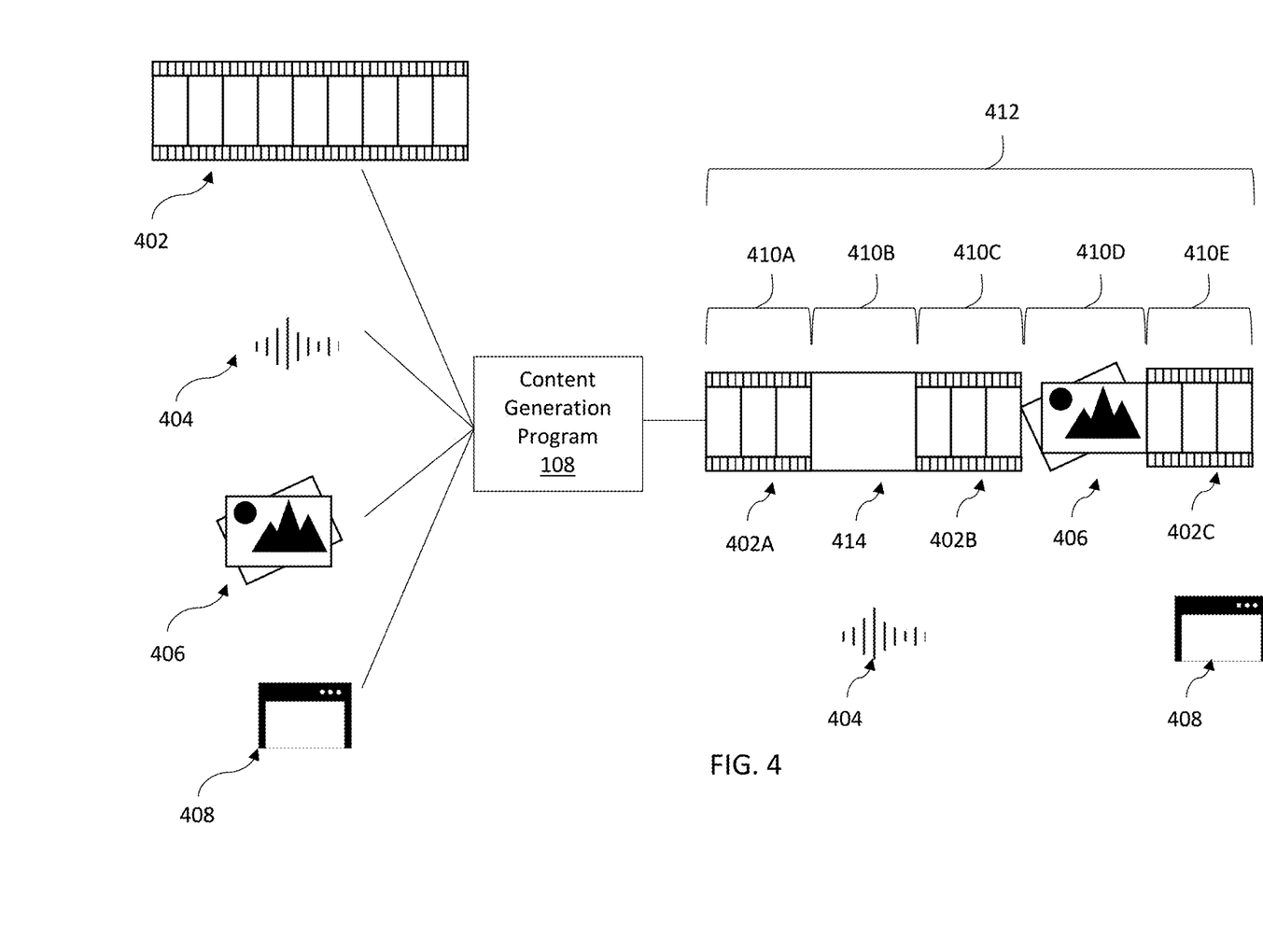
FIG. 4 illustrates an example of content generation program generating a final media content based on multi-types of media content from multiple sources, in accordance with an embodiment of the present invention.

FIG. 4 illustrates an example of content generation program generating a final media content based on multi-types of media content from multiple sources, in accordance with an embodiment of the present invention.

Content generation program 108 receives multi-type media content relating to a specific topic, where the multi-type media content includes video file 402, audio file 404, image 406, and social media post 408. Video file 402 is a video message from a CEO regarding a global announcement of a software product release by company A. Audio file 404 is an audio interview with a market analyst discussing the software product release a market need for the software product release. Image 406 is an image detailing five key new features of the software product release and social media post 408 is an announcement by company B regarding a partnership with company A based on the software product release by company A. Subsequent to content generation program 108 identifying each type of the multi-type media content relating to the specific topic (i.e., the software product release), content generation program 108 identifies statements and responses in video file 402, audio file 404, image 406, and social media post 408. Subsequent to content generation program 108 identifying the statement and responses, content generation program 108 determines a sequence for the identified types and the identified statement and responses in the multi-type media content relating to the software product release. The sequence is illustrated by segments 410A, 410B, 410C, 410D, and 410E, where content generation program 108 utilizes a video file 402 as base media content for final media content presentation file 412. Content generation program 108 generates final media content presentation file 412 based on the sequence of segments 410A, 410B, 410C, 410D, and 410E and displays final media content presentation file 412 on client device.

In this example, segment 410A of final media content presentation file 412 represents a first portion of video file 402, where the CEO provides introductory remarks regarding needs in the marketplace for the software product release. Segment 410B of final media content presentation file 412 includes audio file 404 of the audio interview of the market analyst discussing a market need for the software product release, where additionally source media content 414 relates to audio file 404 (e.g., an image of a company logo associated with the market analyst or subtitle text for the interview of audio file 404). Content generation program 108 can utilize a relevant portion of audio file 404 or an entirety of audio file 404 for segment 410B. Segment 410C of final media content presentation file 412 represents a second portion of video file 402, where the CEO announces five key features of the software product release. Segment 410D of final media content presentation file 412 includes image 406 detailing the five key new features of the software product release that the CEO announced in segment 410C of final media content presentation file 412. Content generation program 108 can overlay image 406 onto the second portion of video file 402 to shorten a length of final media content presentation file 412, where both image 406 and the second portion of video file 402 are viewable to the user. Segment 410E of final media content presentation file 412 represents a third portion of video file 402, where the CEO of company A announces potential for new clients with the software product release. Segment 410E of final media content presentation file 412 also includes an overlay of social media post 408 with the announcement by company B regarding a partnership with company A based on the software product release by company A.

Embodiments of the present invention produce an identification of related topical subject matter and further correlate the multiple media sources for new reporting inputs, thereby adding and interleaving responses to various queries in an entire sequence via a multi-modal approach. This allows for the creation of streamlined media content information in chronological sequence with information captured in multi-modal format from multiple sources. The multiple forms can include but is not limited to, audio, video, text, or other forms of rich media generated by news reporting agencies. The purpose of the correlation is to satisfy a topical subject matter curiosity of the user base for a given news reporting audience. The multiple media approach produces a holistic content rich tailored feed that is predictive in nature to satisfy future amelioration of related news content, subject matter, and cross validation thereof.

Media content generation engine (content generation program 108):

Utilizing contextual analysis via LSTM module working in conjunction with NLP, operating on two or more media contents (e.g., press conferences, interviews, statements and opinions, comments and arguments, possible question and answer pairs are identified), and accordingly the media content generation engine dynamically arranges the media sections from different sources to create question and answer based media content.

Rules generation/predefined settings: Media content generation engine will have different types of rules to assemble different types of media content. In this case, the rule can be if text information is found, how the textual information is to be displayed or if image information is found, how the image is shown in the created video file. For a use case, the proposed invention gathers possible questions and answers, statement and opinions, comments and arguments from different sources, so media content generation engine segments the said media content individually and arranges in a question and answer based format.

Multi-source data aggregation: While deriving possible question and answer pairs, the media content generation engine analyzes a type of sources (e.g., video, recorded audio, recorded telephonic conversation, textual information, like tweets) and accordingly, while creating question and answer based media content, the media content generation engine identifies how the content is to be arranged. Above data is ingested in the Operation sequencing module consisting of LSTM-RNN model which fetches information for sequence generation based on user preferences. For a use case, a reply to a question is found in a text, but the question was recorded in video. In this case the media content generation displays the question with video and displays an answer as a caption in the video in a user viewable form. If both question and answers are recorded in a video, then an answer portion of a question is extracted and placed after the question.

For content identification, based on the identified pairs of question and answers, response and feedback etc., the appropriate media content are splatted and the each and every splatted content is uniquely identifiable. In this case the splatted content can be, a video portion, textual paragraph, an image, or voice portion. For sentence tokenization and word embedding as part of the data aggregation and extracting relevant information for future sequencing of operation, embodiments of the present invention performs a feature extraction for each sentence utilizing: count vectors, word level term frequency-inverse document frequency (TF-IDF), N-Gram Level TF-IDF, character level TF-IDF, and global vectors for word representation (GloVe).

Question and Answer Congregation Mechanism:

The media content generation engine identifies if multiple answers or opinions against any question or comments are identified, then based on predicted confidence scores, proper sorted sequence is generated so that the news is reported in real perspective.

Operation Sequencing:

The media content generation engine analyzes the duration of each content (e.g. duration of Question and duration of Answer). In above case, a cloud service running in the backend ingests: X_1<Data/Time format>=Event Timing In such kind of disambiguation, X_2<word2Vec>=Sentence segmentation and tokenization (context of question and answer during the event), X_3<NLC analysis/Time>=Q/A duration. These are the major features to be taken into account before predicting the sorted sequence. Accordingly, the media portions are assembled considering where still image are to be shown, where overlay image are to be placed, where caption are to be displayed etc. The media content generation engine assembles the multi-sourced media contents so that one complete video (i.e., the final media content presentation file) is generated and along with the video playing a complete conversation is identified. The media content generation engine identifies appropriate mode of assembling the media content to create a question and answer based media content, where the media content generation engines adds an audio layer for required audio and caption layer for required text.

Figure 5:
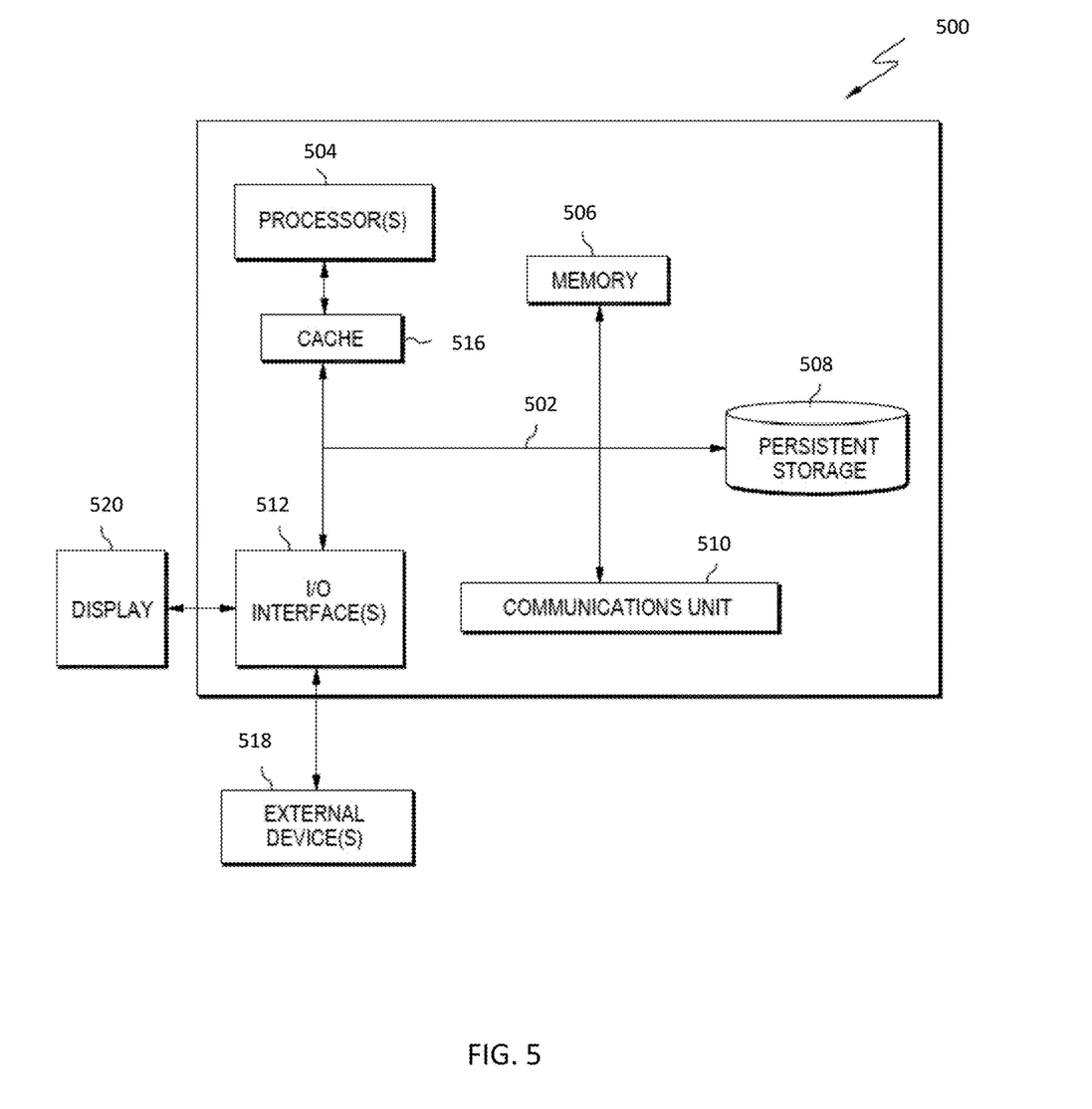
FIG. 5 is a block diagram of components of a computer system, such as the server computer of FIG. 1, in accordance with an embodiment of the present invention.

FIG. 5 depicts computer system 500, where server computer 102 is an example of a computer system 500 that includes content generation program 108. The computer system includes processors 504, cache 516, memory 506, persistent storage 508, communications unit 510, input/output (I/O) interface(s) 512 and communications fabric 502. Communications fabric 502 provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
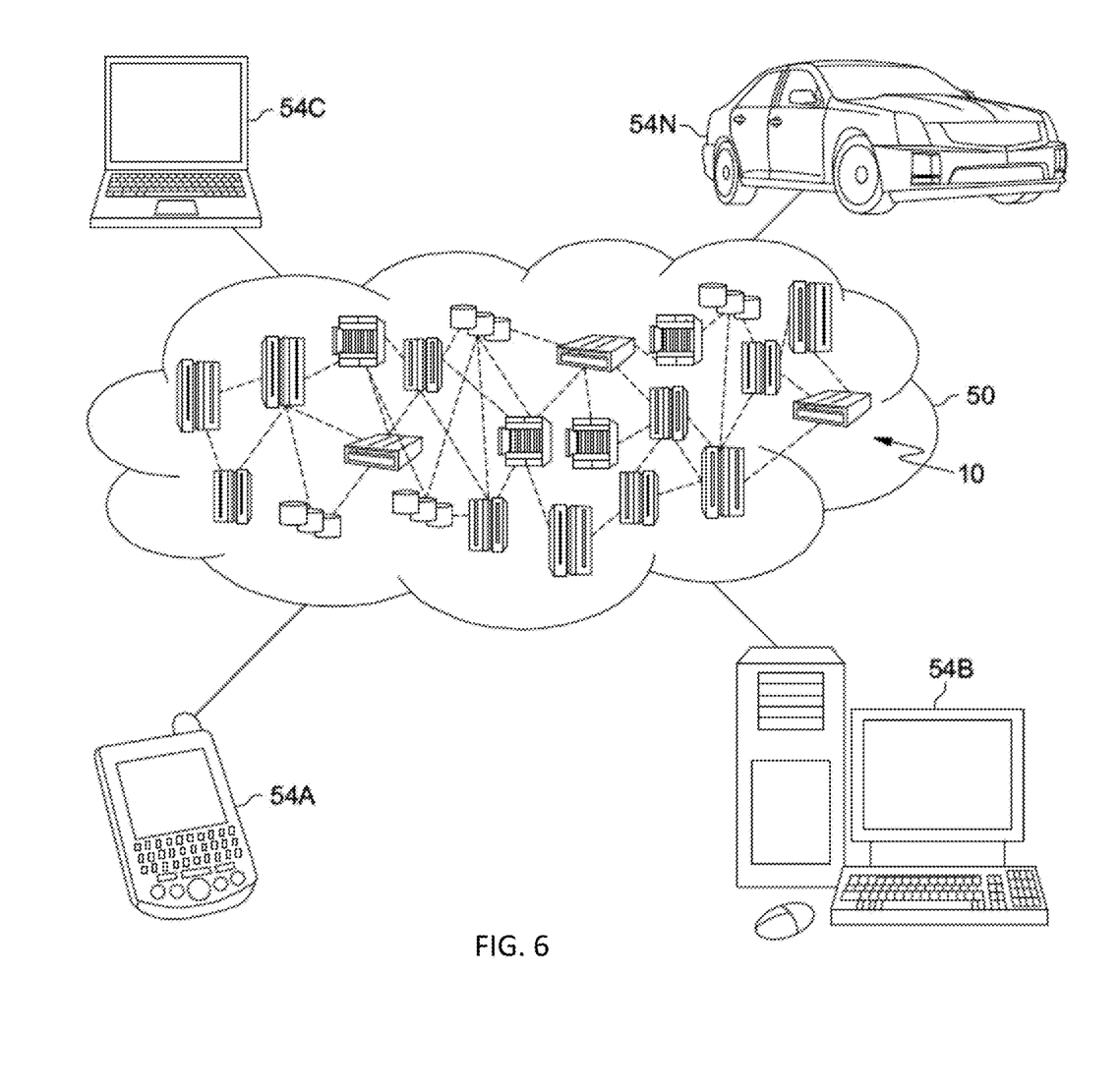
FIG. 6 depicts a cloud computing environment, in accordance with an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
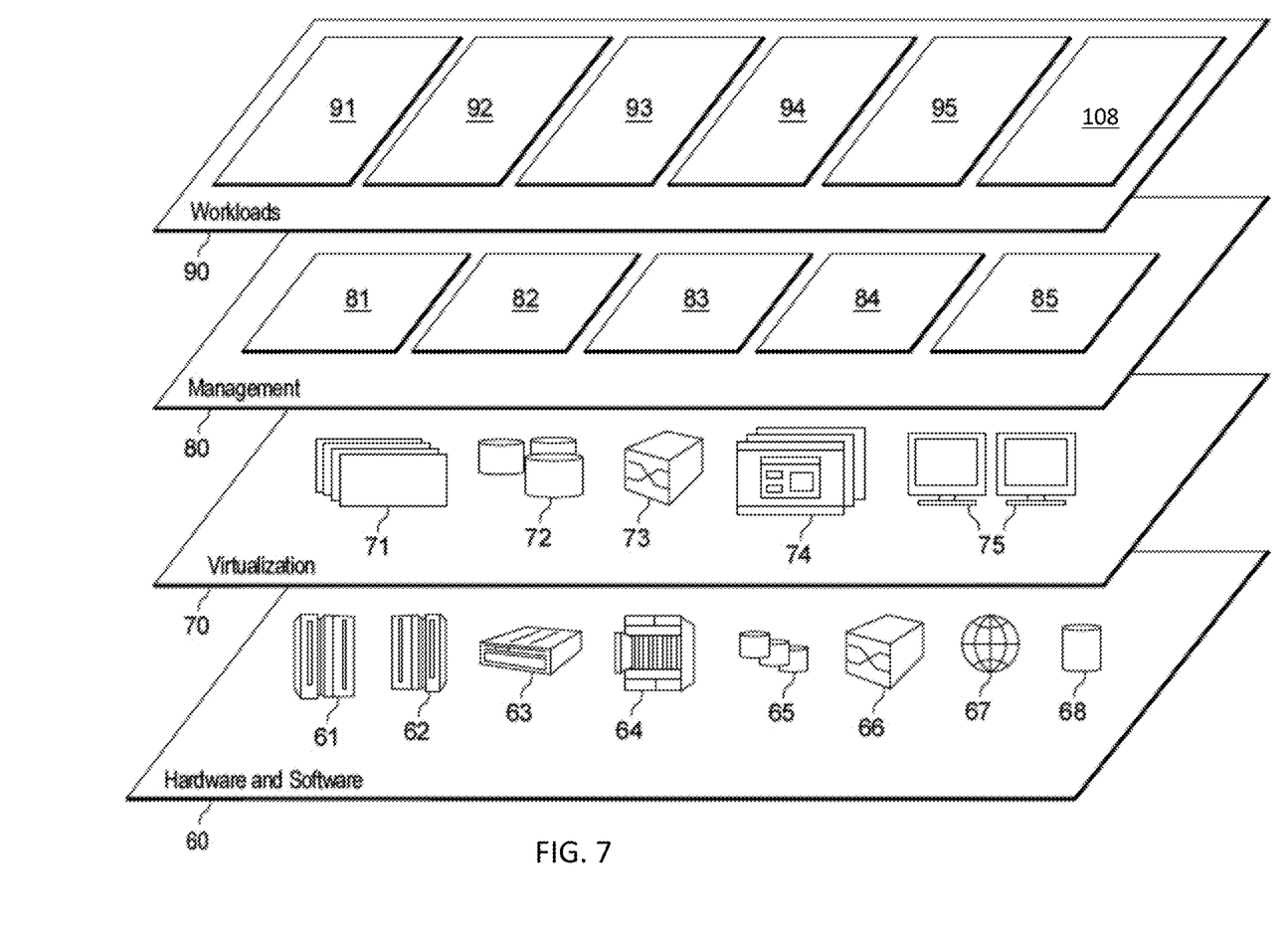
FIG. 7 depicts abstraction model layers, in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content generation program 108.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    receiving multi-type media content relating to a specific topic that includes a product release, wherein the multi-type media content includes at least a first type of media content from a first digital platform relating to a product specification for the product release and a second type of media content from a second digital platform relating to a press release associated with the product release;
    identifying a first statement in a first portion of the first type of media content from a plurality of statements provided by a first source and directed to the product specification for the product release;
    identifying a second statement in a second portion of the second type of media content provided by a second source and directed to the press release associated with the product release;
    identifying the first statement is referred to in the second statement based on one or more product features for the product release being present in the first statement and the second statement, wherein the first statement lists the one or more features from the product specification for the product release and the second statement introduces the one or more features for the product release;
    determining a chronological sequence for the first portion of the first type of media content and the second portion of the second type of media content;
    generating a final media content presentation file for the determined chronological sequence relating to the specific topic, wherein the second statement provided by the second source directed to the specific topic in the second portion of the second type of media content from the second digital platform is presented first in the final media content presentation file and the first statement provided by the first source directed to the specific topic in the first portion of the first type of media content from the first digital platform is presented second in the final media content presentation file; and
    displaying the final media content presentation file for the determined chronological sequence relating to the specific topic, wherein the final media content presentation file is the press release for the product release with an overlay of the one or more features from the product specification for the product release.

2. The computer-implemented method of claim 1, further comprising:
    applying long short-term memory (LSTM) module working in conjunction with natural language processing to identify the first statement in the first portion of the first type of media content and the second statement in the second portion of the second type of media content.

3. The computer-implemented method of claim 1, further comprising:
    identifying the multi-type media content based on one or more predefined limits.

4. The computer-implemented method of claim 3, wherein the one or more predefined limits are selected from a group consisting of: include file size, video length, audio length, an amount of text, an amount of video files, an amount of audio files, a file version limit, and a publishing date.

5. The computer-implemented method of claim 4, further comprising:
    responsive to displaying the final media content presentation file in a user interface of a client device associated with a user, querying the user for feedback regarding the final media content presentation file, wherein the user can adjust at least one of: the defined time parameter and the one or more predefined limits.

6. A computer program product comprising one or more computer readable storage media and program instructions collectively stored on the one or more computer readable storage media, the stored program instructions executable by one or more computer processors, the stored program instructions comprising:
program instructions to receive multi-type media content relating to a specific topic that includes a product release, wherein the multi-type media content includes at least a first type of media content from a first digital platform relating to a product specification for the product release and a second type of media content from a second digital platform relating to a press release associated with the product release;
program instructions to identify a first statement in a first portion of the first type of media content from a plurality of statements provided by a first source and directed to the product specification for the product release;
program instructions to identify a second statement in a second portion of the second type of media content provided by a second source and directed to the press release associated with the product release;
program instructions to identify the first statement is referred to in the second statement based on one or more product features for the product release being present in the first statement and the second statement, wherein the first statement lists the one or more features from the product specification for the product release and the second statement introduces the one or more features for the product release;
program instructions to determine a chronological sequence for the first portion of the first type of media content and the second portion of the second type of media content;
program instructions to generate a final media content presentation file for the determined chronological sequence relating to the specific topic, wherein the second statement provided by the second source directed to the specific topic in the second portion of the second type of media content from the second digital platform is presented first in the final media content presentation file and the first statement provided by the first source directed to the specific topic in the first portion of the first type of media content from the first digital platform is presented second in the final media content presentation file; and
program instructions to display the final media content presentation file for the determined chronological sequence relating to the specific topic, wherein the final media content presentation file is the press release for the product release with an overlay of the one or more features from the product specification for the product release.

7. The computer program product of claim 6, the stored program instructions further comprising:
program instructions to apply long short-term memory (LSTM) module working in conjunction with natural language processing to identify the first statement in the first portion of the first type of media content and the second statement in the second portion of the second type of media content.

8. The computer program product of claim 6, the stored program instructions further comprising:
program instructions to identify the multi-type media content based on one or more predefined limits.

9. The computer program product of claim 8, wherein the one or more predefined limits are selected from a group consisting of: include file size, video length-audio length, an amount of text, an amount of video files, an amount of audio files, a file version limit, and a publishing date.

10. The computer program product of claim 9, the stored program instructions further comprising:
program instructions to, responsive to displaying the final media content presentation file in a user interface of a client device associated with a user, query the user for feedback regarding the final media content presentation file, wherein the user can adjust at least one of: the defined time parameter and the one or more predefined limits.

11. A computer system comprising:
one or more computer processors;
one or more computer readable storage media; and
program instructions stored on the computer readable storage media for execution by at least one of the one or more computer processors, the program instructions comprising:
program instructions to receive multi-type media content relating to a specific topic that includes a product release, wherein the multi-type media content includes at least a first type of media content from a first digital platform relating to a product specification for the product release and a second type of media content from a second digital platform relating to a press release associated with the product release;
program instructions to identify a first statement in a first portion of the first type of media content from a plurality of statements provided by a first source and directed to the product specification for the product release;
program instructions to identify a second statement in a second portion of the second type of media content provided by a second source and directed to the press release associated with the product release;
program instructions to identify the first statement is referred to in the second statement based on one or more product features for the product release being present in the first statement and the second statement, wherein the first statement lists the one or more features from the product specification for the product release and the second statement introduces the one or more features for the product release;
program instructions to determine a chronological sequence for the first portion of the first type of media content and the second portion of the second type of media content;
program instructions to generate a final media content presentation file for the determined chronological sequence relating to the specific topic, wherein the second statement provided by the second source directed to the specific topic in the second portion of the second type of media content from the second digital platform is presented first in the final media content presentation file and the first statement provided by the first source directed to the specific topic in the first portion of the first type of media content from the first digital platform is presented second in the final media content presentation file; and
program instructions to display the final media content presentation file for the determined chronological sequence relating to the specific topic, wherein the final media content presentation file is the press release for the product release with an overlay of the one or more features from the product specification for the product release.

12. The computer system of claim 11, the stored program instructions further comprising:
  program instructions to apply long short-term memory (LSTM) module working in conjunction with natural language processing to identify the first statement in the first portion of the first type of media content and the second statement in the second portion of the second type of media content.

13. The computer system of claim 11, the stored program instructions further comprising:
  program instructions to identify the multi-type media content based on one or more predefined limits.

14. The computer system of claim 13, wherein the one or more predefined limits are selected from a group consisting of: include file size, video length, audio length, an amount of text, an amount of video files, an amount of audio files, a file version limit, and a publishing date.

15. The computer system of claim 11, the stored program instructions further comprising:
  program instructions to, responsive to displaying the final media content presentation file in a user interface of a client device associated with a user, query the user for feedback regarding the final media content presentation file, wherein the user can adjust at least one of: the defined time parameter and the one or more predefined limits.

* * * * *